(12) United States Patent
Erden

(10) Patent No.: US 10,034,487 B2
(45) Date of Patent: Jul. 31, 2018

(54) MANUFACTURING METHOD AND APPARATUS FOR POPPING CANDY

(71) Applicant: Tolga Erden, Istanbul (TR)

(72) Inventor: Tolga Erden, Istanbul (TR)

( * ) Notice: Subject to any disclaimer, the term of this patent is extended or adjusted under 35 U.S.C. 154(b) by 14 days.

(21) Appl. No.: 14/872,243

(22) Filed: Oct. 1, 2015

(65) Prior Publication Data

US 2016/0058029 A1    Mar. 3, 2016

Related U.S. Application Data

(62) Division of application No. 13/575,044, filed as application No. PCT/IB2011/050414 on Jan. 31, 2011, now Pat. No. 9,215,883.

(30) Foreign Application Priority Data

Jan. 29, 2010 (TR) .................................. 2010 00672
Jan. 28, 2011 (TR) .................................. 2011 00839

(51) Int. Cl.
*A23G 3/02* (2006.01)
*A23G 3/52* (2006.01)
*A23G 3/56* (2006.01)

(52) U.S. Cl.
CPC ......... *A23G 3/0226* (2013.01); *A23G 3/0221* (2013.01); *A23G 3/0252* (2013.01); *A23G 3/0294* (2013.01); *A23G 3/52* (2013.01); *A23G 3/563* (2013.01); *A23V 2002/00* (2013.01)

(58) Field of Classification Search
CPC ...... A23G 3/0226; A23G 3/0252; A23G 3/52; A23G 3/563; A23G 3/0221; A23G 3/0294; A23V 2002/00
See application file for complete search history.

(56) References Cited

U.S. PATENT DOCUMENTS

| 4,262,029 | A | 4/1981 | Kleiner et al. |
| 4,273,793 | A | 6/1981 | Fariel et al. |
| 7,654,194 | B2 * | 2/2010 | Lagares Corominas ............. A23L 3/001 165/104.14 |
| 7,757,601 | B2 * | 7/2010 | Lagares Corominas . A23L 5/13 165/61 |

FOREIGN PATENT DOCUMENTS

| EP | 0326692 A2 | 8/1989 |
| GB | 2163636 A | 3/1986 |
| WO | 2004073412 A1 | 9/2004 |
| WO | 2011092669 A1 | 8/2011 |

OTHER PUBLICATIONS

International Search Report issued by the European Patent Office, dated May 23, 2011.

* cited by examiner

*Primary Examiner* — Steven Leff

(74) *Attorney, Agent, or Firm* — Notaro, Michalos & Zaccaria P.C.

(57) ABSTRACT

A method and apparatus for producing popping candy which is formed in molds. A reactor with one or more trays holds the product and one or more moveable transmission mechanisms and one or more lids provided at each end of the reactor act as inlets and outlets. One or more two way valves regulate and maintain inside pressure of the reactor and cooling and heating mechanisms are provided.

15 Claims, 5 Drawing Sheets

MANUFACTURING METHOD AND APPARATUS FOR POPPING CANDY

RELATED APPLICATION

This is a divisional application of U.S. application Ser. No. 13/575,044, filed Jul. 25, 2012, which is incorporated here by reference, and which is a 371 application on PCT Application No. PCT/IB2011/050414, filed Jan. 31, 2011 which is also incorporated herein by reference and which claimed priority on Turkish Application No. 2011/00839, filed Jan. 28, 2011 and Turkish Application No. 2010/00672, filed Jan. 29, 2010.

FIELD AND BACKGROUND OF THE INVENTION

This invention is related to a method and apparatus for producing popping candy which is formed in moulds.

Manufacturing popping candy is well known in art.

Popping candy is a candy which has an entertaining effect during consumption and it is manufactured by creating bubbles within the candy mass by introducing $CO_2$ gas into the mass while it is still viscous and after cooled down the bubbles are popped in mouth as wetted with saliva.

SUMMARY OF THE INVENTION

Popping candy can be manufactured in several forms and shapes and also lollipop candy can be manufactured by inserting sticks into the candy.

Several methods for manufacturing popping lollipop candy were described in several references in prior art. For instance, U.S. Pat. No. 4,273,793 describes a method wherein the moulds into which the candy is poured are pressurized beforehand so as to prevent the escape of gas from candy.

Also, a method in which the candies are placed into the gaps placed on a conveyor belt is described in U.S. Pat. No. 4,262,0292.

The disadvantages of those systems are that the methods are not continuous and impractical as far as time and cost wise.

In prior art, GB2 163 636 is the closest prior art wherein the lollipop manufacturing method is described.

The disadvantage of this method is that the whole system is pressurized and when there is a problem which requires instant access and interference, the gas pressure of the system must be lowered. This means a loss as far as the used gas and also the product that is being manufactured.

Thus, instant interference to the system when the system is active is not possible.

The present invention has an object to eliminate above mentioned disadvantages by providing a method and apparatus which is simpler than prior art. In the method according to this invention, wastage is quite low when compared to prior art and that wastage are returned to the system for further processing.

The method and apparatus according to this invention is described in detail here below by giving reference to the attached drawings. In the drawings:

DESCRIPTION OF THE PREFERRED EMBODIMENTS

Figure 1:
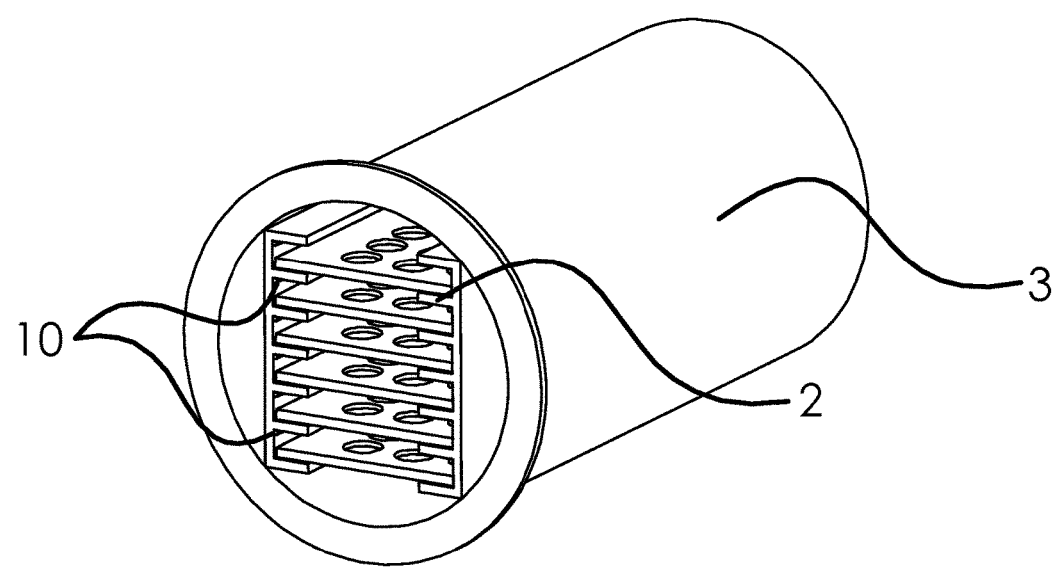
FIG. 1 is the front perspective view of the reactor.
Figure 2:
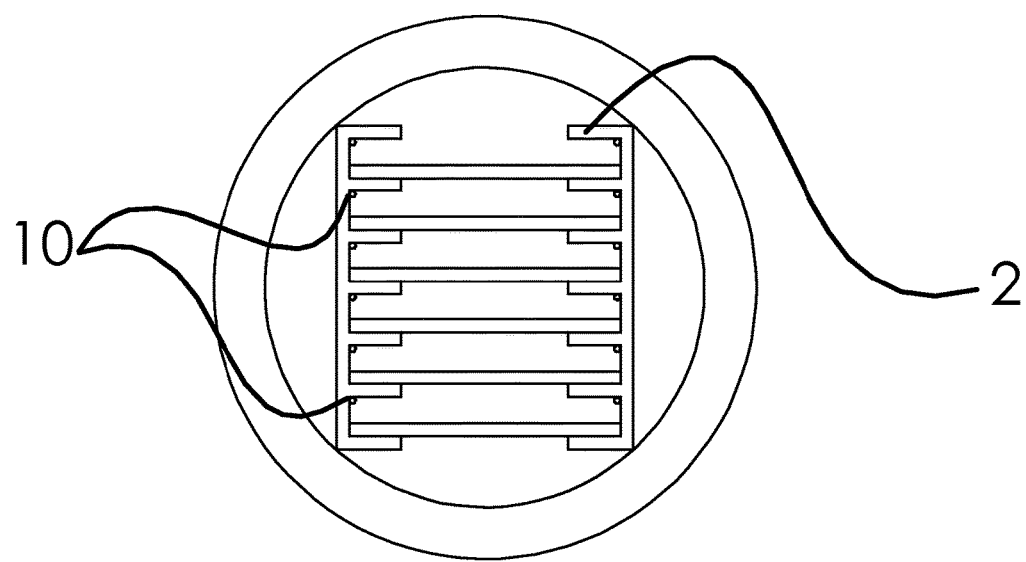
FIG. 2 is the front cross section view of the reactor.
Figure 3:
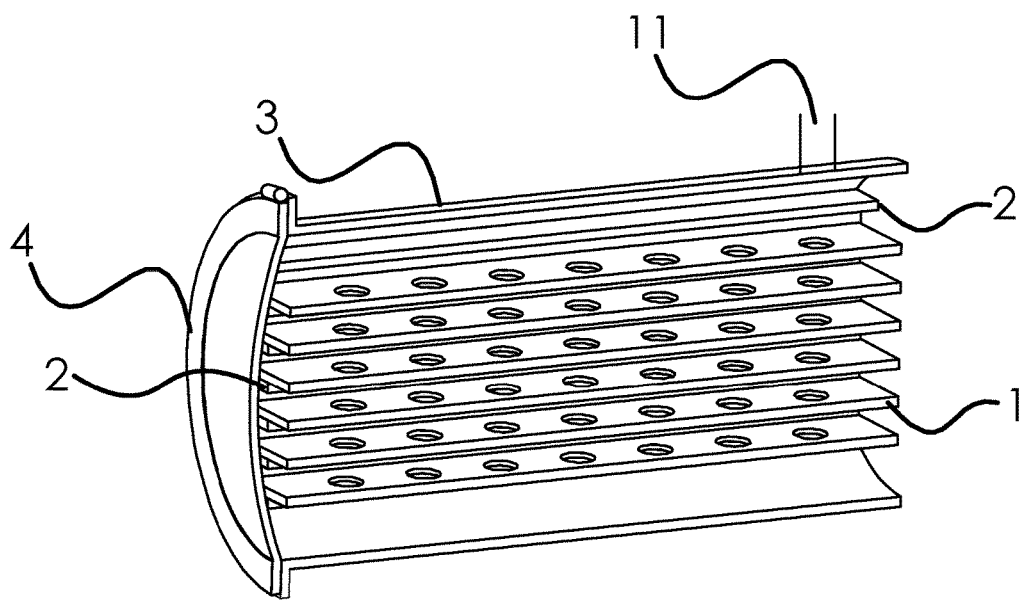
FIG. 3 is the side cross section view of the reactor.
Figure 4:
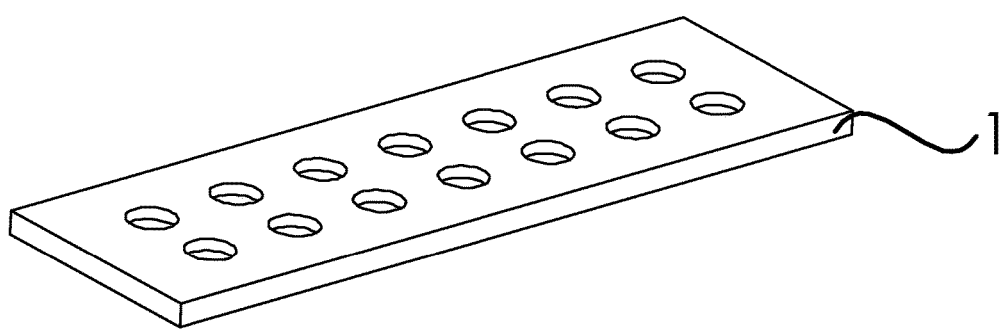
FIG. 4 shows the molded trays that are placed into the reactor.
Figure 5:
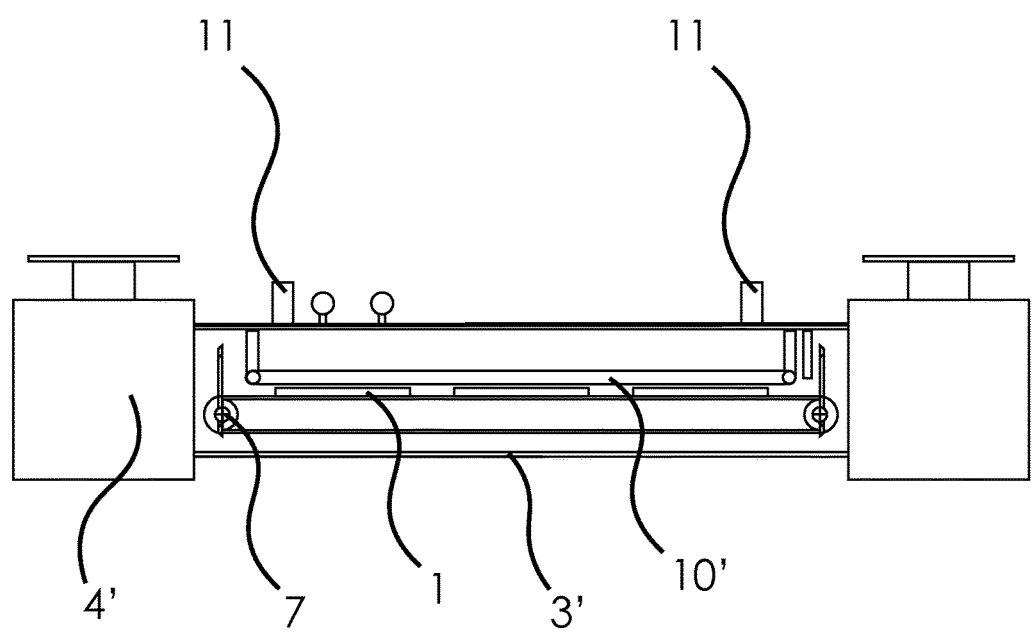
FIG. 5 shows an alternative embodiment of the reactor (3') according to this invention.

In order to manufacture popping candy and popping lollipop candy with the method and apparatus described in this application, first a candy/caramel mass having a moisture content of 2.5% is prepared.

The method to manufacture popping candy according to this invention is realized in three stages; the first one is conducted in a carbonisator (not known) after the candy mass is prepared wherein the candy mass is pulled and opacified. In the second stage the candy mass is shaped like a cord in a pulling machine.

In the third stage which constitutes the essential part of the invention is related to the molding and baking procedure.

In the first stage the viscous candy mass that is prepared in the first stage is transferred to the carbonizator. Carbonizator is a air tight machine which has scraping and mixing blades. Any conventional carbonizator can be used.

It has $CO_2$ medium and is formed as a air tight apparatus so as to contain only $CO_2$ in it.

The reservoir and blades are preferably made of stainless steel. In order to maintain the viscosity of the candy mass in the apparatus, electric resistors are provided in it.

While the candy is still viscous it is placed into the machine by means of a side opening door. There are air tight sealants provided around the doors to protect the $CO_2$ medium inside.

The gas density within the cylinder is lowered by means of the $CO_2$ gas that is introduced into the candy while mixing.

Gas is introduced in to the apparatus as long as the mixing is continued.

The lids/door(s) is closed after the hot viscous candy is placed in to the carbonisator and the candy mass is started to be mixed and kneaded via the movement of the mixing blades within medium containing $CO_2$ gas.

The $CO_2$ gas is fully penetrated in to the candy mass during mixing and kneading and thus causes the formation of bubbles within the candy mass.

The vertical carbonisator which is also called pulling machine in art is cylindrical and has mixing blades in it.

The blades of the apparatus provide a good kneading with $CO_2$ gas in the vessel. As $CO_2$ gas is heavier than air, it is introduced to the vessel from its lower end and there are $CO_2$ sensors that are placed to the top part of the container to sense that the $CO_2$ is filled in completely. As the sensors are activated, the air vane is closed automatically.

Also there are sensors placed to the lower peripheral to the cylindrical container so check whether the gas is absorbed by the candy mass.

The sensors transmit signals as soon as the $CO_2$ gas level is lowered. In case if the mixing and kneading is finalized, candy is poured out of the vessel with minimum gas loss.

During kneading, gas is provided to the system and candy mass is kept in $CO_2$ atmosphere until the mixing is finished.

The carbonizator can be placed either horizontally or vertically. In the horizontal carbonizator the mixing blades are provided horizontally as well.

After it leaving the vessel, the candy mass losses its heat in room atmosphere without a further cooling.

While the candy is still viscous like a paste is inserted into the rope sizer machine to be pulled like a cord in conventional style. As the candy mass is opacified after mixing for some time, it is pulled in a cord shape and placed in to the mould to be cut into desired sizes. The candy pieces that are cut into pieces are placed into the nonstick trays having cavities that correspond to the shape of the final product. If the final products are to be lollipops, the sticks thereof can be placed into the candy by conventional methods.

Although the candy mass is cooled down to some degree, as it is still pasty, the candy pieces takes the form of the cavities in the trays quite easily.

In the third stage the candy mass is processed in the reactor (3) which is the essential part of this invention.

The reactor (3) comprises rails (2) into which the trays (1) are placed, pipes (10) through which coolant and heating fluids and gases are circulated, a lid (4) to insert the trays (1) into the reactor (3), two way valve (11) to pressurize the reactor (3).

Through a sealant (now shown) provided around said lid (4) the impermeability of the reactor is provided The trays (1) have cavities to correspond the shape of the final product.

The trays contain the still pasty candy in the shaped cavities are placed into the rails (2) that are provided in said reactor (3) and as the lid (4) is closed, the reactor becomes impermeable against the outer atmosphere.

Although the reactor in the preferred embodiment of the invention is cylindrical, any other suitable form can be used.

The reactor according to this invention has a diameter of 10 cm to 100 cm and the length is 2 to 10 meters.

Although the reactor (3) has one wall, it may well have more than one wall. The reactor (3) is manufactured of stainless steel to endure a pressure of 2 to 300 bar.

As the trays are placed into the reactor (3), the lids (4) of the reactor are closed and $CO_2$ gas is injected into the reactor through the valve (11) and the $CO_2$ gas becomes effective on the still pasty candy.

The pressure of 1 to 150 bar that is applied to candy creates lucidity in candy which is caused by the decreased diameter of the $CO_2$ bubbles under high pressure.

As the high pressure is applied for 1 to 15 minutes, the reactor is cooled down through the cooling fluid or gas that is being circulated in the heating and cooling pipeline (10).

The heating pipeline (10) is preferably placed beneath and along the trays.

Cooling pipeline (10) is preferable placed above each and along trays (1). As the products are cooled down to room temperature and hardened, they are removed from the reactor from the lid (4). The bubbles caused by high pressure and $CO_2$ gas are trapped in the cooled down and crystallized candy.

The method according to this invention substantially comprises the following steps:

1.—Applying $CO_2$ gas under heat and atmospheric pressure in the reactor to the already prepared candy mass;
1.—Shaping the candy mass like a cord in pulling machine;
1.—Forming the already shaped candy mass in a shaping machine;
1.—If desired, inserting the sticks;
1.—Placing the candy into the trays (1) having cavities that correspond to the shape of the final products;
1.—Placing the trays (1) into the pressurized reactor (3);
1.—Processing the candy with $CO_2$ gas under a pressure of 10 to 150 bar without being hardened in a hot medium;
1.—Cooling down the reactor (3) to 25° C. and hardening the candy;
1.—Decreasing the pressure in the reactor to atmospheric pressure simultaneously;
1.—Removing the trays our out the reactor and transmitting the products for packaging.

The $CO_2$ gas that is injected into the still viscous candy, the final products has bubbles in it and thus causes pops in mouth.

In an alternative embodiment of this invention, the stages that are conducted in a single reactor are separated to be conducted in different reactors by maintaining the required pressure at each step by using a valve system at the connection points of each reactor that are connected in series.

As explained in previous application, the intermediate products are placed into the trays and those trays are transmitted via a transmission band as known in technique to the system comprising of at least two reactors each is of 0.1 m to 20 m length placed horizontally to ground.

According to an alternative embodiment the reactor (3') which is used to manufacture popping candy essentially comprises one or more moveable transmission means (7) onto which the moulded trays (1) are placed onto; one or more valves (4') located at each end of the reactor(s) to provide inlet and outlet; one or more two way valves (11) that regulates and maintained the inside pressure of the reactor at desired level and cooling and heating means (10').

Said reactor (3') can have one or double walls and preferably placed horizontally.

The cooling and heating means are in the form of pipeline (10') through which cooling and/or heating fluid or gasses are circulated.

Also, said heating means may include resistors, hot air fans, infrared heaters or microwave heater. Said transmission means (7) can be in the form of a conveyor band or chain or steel band to move the trays from one end to the other within the reactor (3').

Said valve (4') provided at each end of the reactor (3') is a pressure proof valve to maintain the pressure and heat within the reactor (3') at desired level.

Said reactor (3') is preferably made of stainless steel and inside and outside thereof is insulated.

Two or more reactors (3') as described above are connected to each other by means of suitable means and the connection is provided by means of said valves (4').

The method according to this invention is realized in serially connected reactors (3') as described above. The method comprises the steps of:

1. a) preparing a candy mass as known in prior art;
1. b) transferring the candy mass to a carbonisator (not shown)
    in order to be mixed with air, $CO_2$ or any other inert gases;
1. c) shaping the candy mass as a cord through a cord machine;
1. d) shaping and sizing the candy mass in a shaping and sizing machine;
1. e) placing the shaped and sized candy pieces into trays (1) having the desired shape of the final product;
1. f) placing the trays (1) onto the transmission means in the reactor via the valve or lid (4, 4');
1. g) providing a suitable pressure level inside the reactor after the valve/lid (4, 4') is closed by means of two way valves (11) and maintaining said pressure;
1. h) heating the inside medium of the reactor (3') by means of heating means (10) to a desired temperature;

1. i) cooling down the reactor (3') medium to a degree to enable the hardening of the candy;

1. j) removing the trays containing the hardened candy having the shape of the final product out of the reactor (3') and forwarding the products to packaging.

As an alternative to the lids (4) used in the first embodiment, the inside pressure of the reactor (3') is provided and maintained through valves (4') in preferred embodiment.

The two way valves (11) provide a pressure of 1 to 150 bar within the reactor (3') after the trays (1) are placed into the reactor (3') and the valves (4') are closed.

Some or all of the steps as described above may be conducted in one or more separate reactors. The reactors may be serially connected or they may be separate reactors. The number of the reactors to be connected is not limited. For instance, the heating and/or cooling steps can be conducted in one or more separate reactors. In case there are more than one reactor, these reactors may be serially connected.

In heating and cooling steps, the inside pressure is regulated as desired and in step (g) the pressure is between 1 to 150 bar.

In case the final product is to include a stick, said sticks can be inserted into the moulds at step (d) or (e). They may even be inserted after step (e).

Also, sensors that sense the increase or decrease of level of desired gas level in reactors (3,3'), temperature sensors, indicators to show the current gas level, temperature indicators, temperature detectors, automatic gas pressure detectors are provided in the reactors. There are also security valves.

All these sensors, indicators and detectors (not shown in figures) are conventional and available in market. They may be digital or mechanical and provided in said reactor at desired number and desired places.

Also, sensors, detectors and actuator means to detect and supervise the proper location of the trays on the transmission means are provided. These may be digital or mechanical and are preferably located at each end of the transmission means.

The above mentioned sensors, indicators, actuators may be connected to a computer for the system to be supervised automatically.

The main reason of conducting heating and cooling steps in separate reactors (3,3') is to decrease the energy loss when cooling and heating steps are conducted in the same reactor.

Thanks to the insulated reactors (3,3') the heat loss that occurs during the heating of the inside medium is diminished.

Following the heating of the products that are currently on the moulded trays, the trays are (1) transmitted via the transmission means to the next reactor (3,3') through the lid/valve (4, 4') by maintaining the pressure at 1 to 150 bar.

Thanks to the valves (4') the manual intervention to lids (4) is eliminated.

With the proposed invention time and energy losses during the heating and cooling of the trays are decreased substantially and this causes a substantial increase in manufacturing capacity.

What is claimed is:

1. A reactor (3;3') that is used in the manufacture of popping candy having a desired shape comprising one or more trays for containing viscous candy having the desired shape of the popping candies (1) that will hold the popping candy; one or more moveable transmission means (2,7); one or more lids or valves (4;4') provided at each end of the reactor to act as an inlet and outlet for making the reactor impermeable against the outer atmosphere; one or more two way valves (11) to regulate and maintain inside pressure of the reactor (3,3') and means for injecting $CO_2$ gas into the reactor for causing bubbles to be formed in the popping candy; and cooling and heating means (10;10').

2. The reactor (3;3') as claimed in claim 1 wherein the tray (1) comprises mould or moulds the final popping candy.

3. The reactor (3;3') as claimed in claim 1 wherein said reactor (3;3') has one or double walls.

4. The reactor (3;3') as claimed in claim 3 wherein the reactor (3;3') is made of stainless steel and has insulated inside and outside surface to eliminate heat loss.

5. The reactor (3;3') as claimed in claim 4 wherein said reactor (3;3') is cylindrical.

6. The reactor (3;3') as claimed in claim 5 wherein said reactor is placed horizontally.

7. The reactor (3;3') as claimed in claim 6 wherein said lid (4) is a air proof and pressure proof lid.

8. The reactor (3;3') as claimed in claim 6 wherein said valve (4') is a air proof and pressure proof valve.

9. The reactor (3;3') as claimed in claim 1 wherein said cooling and heating means (10; 10') comprises pipeline through which cooling and/or heating fluid or gases are circulated.

10. The reactor (3;3') as claimed in claim 9 wherein the heating means is resistor heater, air fan heating, infrared heater or microwave heater or combination thereof.

11. The reactor (3;3') as claimed in claim 1 wherein the transmission means (7) is a conveyor band, or conveyor chain or steel band to move the trays within the reactor from one end to the other end of the reactor or from one reactor to the other through the valves (4').

12. The reactor as claimed in claim 11 wherein the means for injecting $CO_2$ into the reactor are the one or more two way valves (11).

13. The reactor (3;3') as claimed in claim 1 wherein the valve (4') provided in the reactor is a pressure proof valve to maintain the heat and pressure at desired level.

14. A system to realize the manufacturing of moulded popping candy wherein two or more reactors as described in claim 1 are connected to each other horizontally with a suitable means.

15. The system (3;3') as claimed in claim 14 wherein said connection is provided with said valves (4').

* * * * *